United States Patent [19]

Shitanoki et al.

[11] Patent Number: 4,896,742
[45] Date of Patent: Jan. 30, 1990

[54] CONTROL METHOD FOR AUTOMATIC SEAT BELT OF AUTOMOBILE

[75] Inventors: Kazuaki Shitanoki; Masashi Kusumi; Hidetaka Shinozaki; Takahiro Higuchi, all of Utsunomiya, Japan

[73] Assignee: Honda Giken Kogyo Kabushiki Kaisha, Tokyo, Japan

[21] Appl. No.: 256,333

[22] Filed: Oct. 12, 1988

[30] Foreign Application Priority Data

Oct. 14, 1987 [JP] Japan .................. 62-257373

[51] Int. Cl.⁴ ............................................ B60R 21/00
[52] U.S. Cl. ..................................... 180/270; 280/804
[58] Field of Search ............... 180/268, 270; 280/807, 280/804

[56] References Cited

U.S. PATENT DOCUMENTS 4,061,365  12/1977  Nagano et al. ..................... 280/804
4,553,625  11/1985  Tsuge et al. ........................ 180/268
4,659,108   4/1987  Sack et al. ......................... 180/268

FOREIGN PATENT DOCUMENTS 60-39304  11/1985  Japan .

Primary Examiner—Kenneth R. Rice
Attorney, Agent, or Firm—Armstrong, Nikaido, Marmelstein, Kubovcik & Murray

[57] ABSTRACT

A control method for an automatic seat belt of an automobile including interconnecting a seat belt mechanism with a door of the automobile to operate the mechanism with opening and closing of the door so that the seat belt is automatically tightened when the door is closed and loosened when the door is opened, further comprising in addition interconnecting the seat belt mechanism with an ignition switch so that the seat belt is automatically turned from the tightened condition to the loosened condition even when the door is still closed if the ignition switch is turned off or an ignition key is removed from the ignition switch.

1 Claim, 2 Drawing Sheets

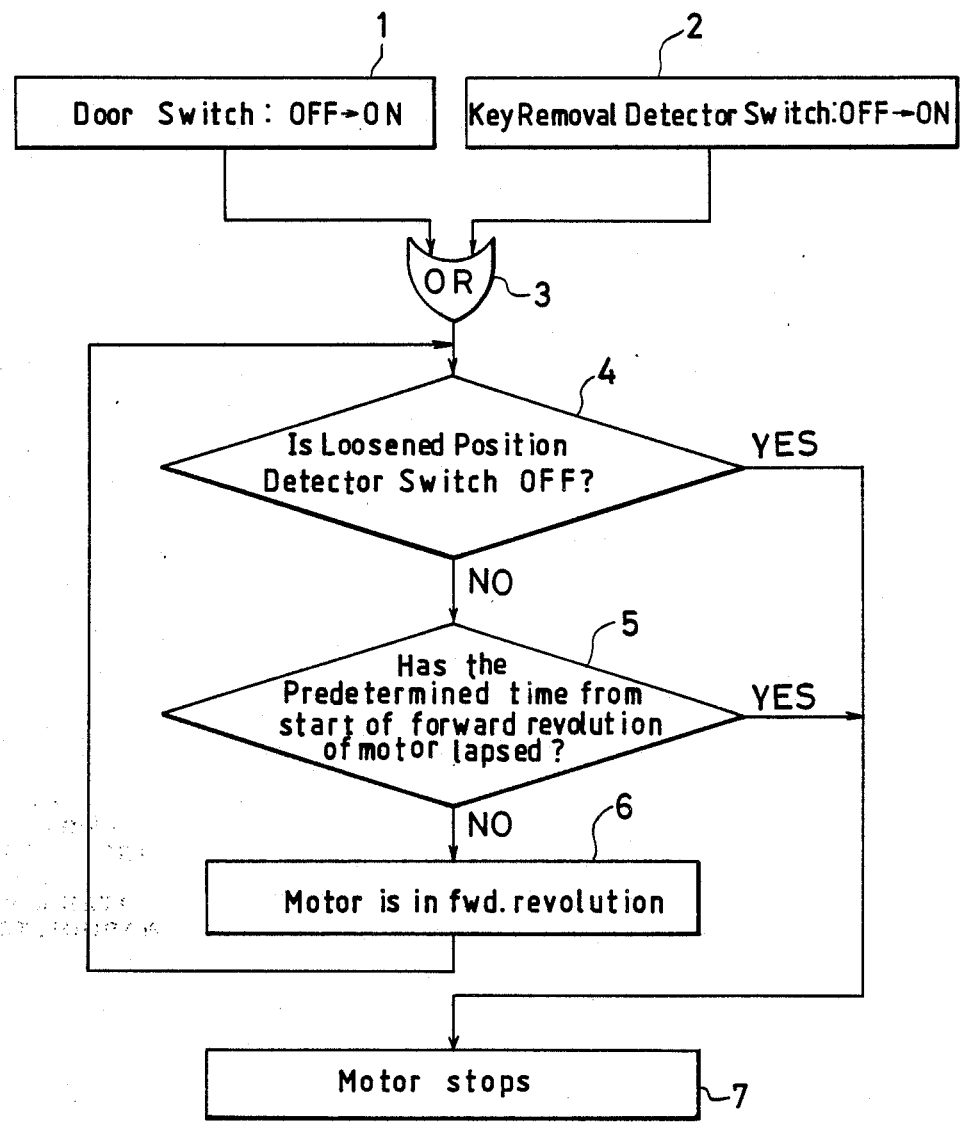

CONTROL METHOD FOR AUTOMATIC SEAT BELT OF AUTOMOBILE

BACKGROUND OF THE INVENTION

This invention relates to a method of controlling an automatic seat belt of an automobile.

An automatic seat belt of an automobile is known which is interlocked to operate automatically with opening and closing of a door. That is, the known automatic seat belt is tightened when the door is closed and loosened when the door is opened.

With an automatic seat belt of a conventional type such as the one described in the foregoing which is interlocked to operate with opening and closing of a door of an automobile, it takes a considerable amount of time for the seat belt to operate to be turned from the tightened condition to the loosened condition, so that a wearer of the belt has to remain seated for some time even after the door is opened. This can often cause feelings of impatience because the wearer cannot get out of the automobile right away with the opening of the door.

SUMMARY OF THE INVENTION

This invention has for its object to provide a control method for an automatic seat belt of an automobile which solves the above-mentioned problem, said method being based on an observation that generally before a door of an automobile is opened, the engine thereof is turned off with an ignition switch and an ignition key is then pulled out of the switch To achieve the above object, the present invention provides a control method for an automatic seat belt of an automobile in which a seat belt is interlocked to operate with opening and closing of a door of an automobile and is automatically tightened when the door is closed and loosened when the door is opened. The inventive method is characterized in that the seat belt is operated to be automatically turned from the tightened condition to the loosened condition even when the door is still closed if the ignition switch is turned off or the ignition key is pulled out of the switch.

When the ignition switch is turned off or the ignition key is removed therefrom in order to be prepared for getting out of the automobile, the seat belt is loosened even before the door is opened, so that the waiting time necessary for a wearer of the seat belt to get out of the automobile after the door is opened can be reduced.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 3 is a flow chart illustrating a control program of the drive unit.

DETAILED DESCRIPTION OF A PREFERRED EMBODIMENT

In the following, a preferred embodiment of this invention will be described with reference to the accompanying the drawings.

Figure 1:
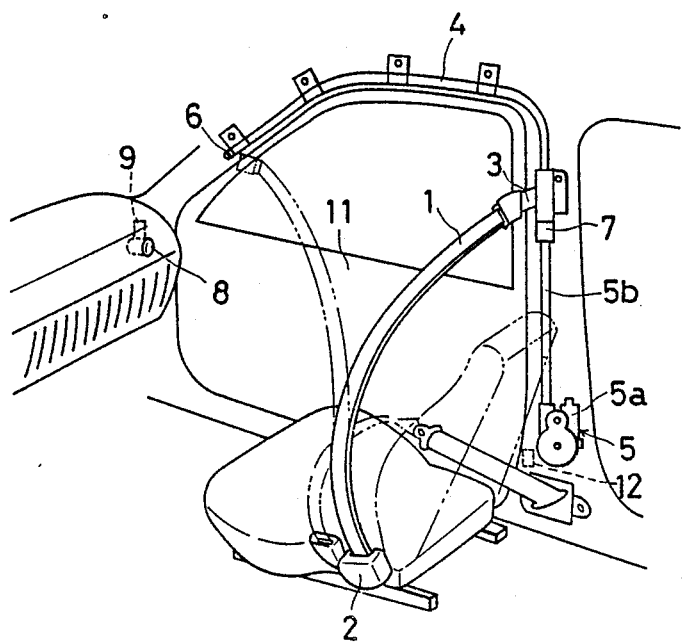
FIG. 1 is a perspective view of important parts of an automobile equipped with a seat belt according to the present invention.
Figure 2:
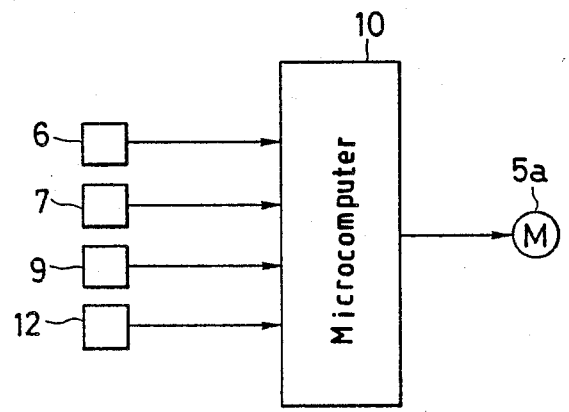
FIG. 2 is a block diagram showing a control circuit of a drive unit according to the present invention.

Referring to FIG. 1, a shoulder belt 1 constitutes a part of a seat belt. One end of the shoulder belt 1 is attached to a retractor 2 which winds up the belt while an anchor 3 provided at the other end of the belt is engaged with a guide rail 4 attached to the upper edge of a door opening of a vehicle body. The anchor 3 is moved by a drive unit 5 along the guide rail 4 so that the shoulder belt 1 may be set to the loosened portion in which the anchor 3 has been moved to remain at the front end of the guide rail 4 and to the tightened position in which the anchor 3 has been moved to remain at the rear end of the guide rail 4 surrounding an occupant of the seat.

The drive unit 5 comprises a motor 5a and a push-pull wire 5b which is advanced and retreated in the lengthwise direction by forward and reverse revolutions of the motor 5a. The push-pull wire 5b is connected to the anchor 3 so that the anchor 3 may be moved to the front end of the guide rail 4 via the wire 5b with forward revolutions of the motor 5a and to the rear end of the guide rail 4 via the wire 5b with reverse revolutions of the motor 5a.

The guide rail 4 is provided at its front end with a loosened position detector switch 6 which is turned OFF when the shoulder belt 1 is set to the loosened position and at its rear end with a tightened position detector switch 7 which is turned OFF when the shoulder belt is set to the tightened position. There is further provided an ignition key removal detector switch 9 which is turned ON when an ignition key is removed from an ignition switch 8. In addition, there is provided an electronic control circuit 10 comprising a microcomputer that operates the motor 5a. ON and OFF signals from the detector switches 6, 7, 9 and ON and OFF signals from a door switch 12 which is turned ON when a door 11 is opened are input to the electronic control circuit 10 so that the motor 5a is controlled with these signals from the foregoing switches 6, 7, 9 and 12 according to an operating program shown in FIG. 3.

More specifically, generation of ON signal from the door switch 12 or that from the key removal detector switch 9 is set as OR condition. When an signal is emitted from either one of the switches, that is, when the door 11 is opened or the ignition key is removed from the ignition switch 8, the motor 5a is operated for forward revolution (Steps 1, 2, 3 and 6). When the anchor 3 is then moved to reach the front end of the guide rail 4 and the loosened position detector switch 6 is thus turned OFF, the motor 5a is stopped (Steps 4 and 7) and the shoulder belt 1 is then held in the loosened position.

Furthermore, it is so arranged that, while the motor 5a is turning in forward revolutions, it can be determined whether or not a predetermined length of time from the start of the motor's forward revolutions such as, for instance, 15 seconds or long enough for the anchor 3 to move from the rear end of the guide rail 4 to the front end thereof has lapsed (Step 5) and that the motor 5a may be stopped when the predetermined time has lapsed even if the loosened position detector switch 6 is not turned OFF. This arrangement is provided for the purpose of preventing exhaustion of the battery power and/or overload to the motor 5a due to an unnecessary continuous operation of the motor 5a when movement of the anchor 3 is blocked.

If desired, the motor 5a may be operated for forward revolutions with an OFF signal from the ignition switch 8 instead of ON signal from the ignition key removal detector switch 9.

Although it is not shown in FIG. 3, when the OFF signal from the door switch 12 and the ON signal from the ignition switch 8 are produced, the motor 5a is kept operating in the reverse direction until the anchor 3 has reached the rear end of the guide rail 4 to turn OFF the tightened position detector switch 7, thus setting the shoulder belt 1 to the tightened position.

As described in the foregoing, according to the present invention, the seat belt starts operating to move from the tightened position to the loosened position as soon as the ignition switch is turned OFF or the ignition key is removed from the ignition switch even if the door is still closed, so that the seat belt may be already operating to loosen the seat belt even before the door is opened, thereby reducing a waiting time for getting out of the automobile after the door is opened.

What is claimed is:

1. A control method for an automatic seat belt of an automobile comprising:
    attaching an anchor to one end of a seat belt in such a manner that the seat belt may be movable along a guide rail attached to a side wall of a cabin of the automobile;
    interlocking the seat belt to operate with opening and closing of a door so that the seat belt is automatically turned to a tightened condition, in which the anchor is located in a rear end portion of the guide rail, when the door is closed and the seat belt is automatically turned to a loosened condition, in which the anchor is located in a front end portion of the guide rail, when the door is opened; and
    automatically turning the seat belt from the tightened condition to the loosened condition, even if the door remains closed, when an ignition key is removed from an ignition switch.

* * * * *